Patented Apr. 12, 1938

2,113,654

UNITED STATES PATENT OFFICE 2,113,654

TREATMENT OF CATALYSTS

Vladimir Ipatieff and Ben B. Corson, Chicago, Ill., assignors to Universal Oil Products Company, Chicago, Ill., a corporation of Delaware No Drawing. Application January 16, 1935, Serial No. 2,114

6 Claims. (Cl. 23—238)

This invention relates more particularly to the treatment, for regenerative purposes, of solid catalysts which have become contaminated with carbonaceous deposits during their use in catalyzing reactions among organic compounds, particularly those involving the polymerization of gaseous olefins to form liquid polymers.

In a more specific sense the invention has reference to the regeneration of spent or exhausted composite catalytic materials which have been employed in granular or powdered form and which have been used to accelerate organic reactions taking place in liquid phase, vapor phase or mixed liquid-vapor phase.

In the case of any particular organic reaction involving decomposition of single compounds or the interaction of two or more compounds, the reaction velocity constants are many times of a low order under moderate conditions of temperature and pressure corresponding to a minimum of secondary or side reactions, these latter resulting in the alteration of the primary desired products. For different reactions catalysts of extremely variable character have been found empirically which accelerate the reactions sufficiently so that laboratory processes can be operated upon a commercial scale.

Very few rules have been evolved which enable the prediction of the catalytic activity of any substance in a given organic reaction or the selection of a particular substance to catalyze a particular reaction. Metals, metal oxides, metal salts, various acids and alkalis, and substances of an ordinarily inert character which furnish an absorbent contacting surface have been tried and in different instances have proven effective. The type of catalyst which is regenerated by the process of the present invention is of an essentially acid character.

In one specific embodiment the present invention comprises the regeneration of catalysts comprising a phosphoric acid and an adsorbent material or a substantially nonreactive carrier, which have been contaminated with carbonaceous deposits during use, by burning off the combustible residues with air at temperatures sufficiently high to insure substantially complete removal of the carbonaceous material, and following this treatment by treatment with steam at a lower temperature to rehydrate the phosphoric acid to a composition corresponding to maximum catalytic activity.

The essential and active ingredient of the solid catalysts which are regenerated by the present process for use in organic reactions is an acid of phosphorus, preferably one in which the phosphorus has a valence of 5. The acid may constitute 80% or more of the original catalyst mixture, and in most cases is over 30% by weight thereof. Of the various acids of phosphorus, the orthophosphoric acid ($H_3PO_4$) finds general application in the primary mixtures, due partly to its cheapness and the readiness with which it may be procured although any of the other acids of phosphorus may have been used insofar as they were found to be adaptable. Each of the various composite solid catalyst mixtures made up with different acids of phosphorus and different carriers will obviously exert its own peculiar catalytic activity in any given reaction. Owing to the original differences in catalyst composites which may be regenerated by the present process and also to the extremely variable conditions of service to which they may be exposed, the various spent catalysts will show widely varying response to the process of regeneration and require different conditions of burning in regard particularly to time and temperature, and will also require different amounts of steam and temperatures and time of application before satisfactory regeneration is accomplished.

In making up the solid catalysts whose regeneration after use is the object of the present invention, orthophosphoric acid may be used as a primary ingredient, different concentrations of the aqueous solution being employed from approximately 85 to 100% or acid containing some free phosphorus pentoxide may even be used. (By this is meant that the ortho acid may contain a definite percentage of the pyro acid corresponding to the primary phase of dehydration of the ortho acid.) Within these concentration ranges, the acids will be thick liquids of varying viscosity and readily incorporated with absorbent material. In practice it has been found that pyrophosphoric acid corresponding to the formula $H_4P_2O_7$ is readily incorporated with siliceous and relatively inert carriers at temperatures somewhat above its melting point (142° F.) and that the period of heating which is given to the acid-absorbent mixtures may be lower than that employed in the case of the ortho acid.

The production of highly effective phosphoric acid catalysts for organic reactions in substantially solid granular form is accomplished primarily by the alternative use of a number of different absorbent carrying materials which vary somewhat in their absorptive capacity and also in their chemical and physical properties and their influence upon the catalytic effect of the mixtures. The usual procedure in making up these catalysts is to first thoroughly mix the chosen proportions of acid and carrier and then calcine the mixture at some temperature in the neighborhood of 572° F. to produce a solid cake comprising a maximum proportion of a phosphoric acid of proper composition. The cake is then ground and sized to produce the granular particles for contact service, the usual range of size being from about 4–10 mesh for best results.

The materials which are employed as absorbents or carriers are divisible roughly into two classes. The first class comprises materials of a predominately siliceous character and includes diatomaceous earth, kieselguhr and artificially prepared forms of porous silica such as, for example, Sil-O-Cel. In the case of naturally occurring diatoms it is believed that they sometimes contain minor amounts of highly active aluminum oxide which in some instances seems to contribute to the total catalytic effect of the solid catalyst. This active material is not present in the artificially prepared forms of silica.

The second class of materials which are employed either alone or in conjunction with the first class comprises generally certain members of the class of aluminum silicates and includes such naturally occurring substances as the various fuller's earths and clays such as Bentonite, Montmorillonite, etc. The class also includes certain artificially prepared aluminum silicates of which the products known as Tonsil and Filtrol are representative, these substances being in a sense purified aluminum silicate made by treating certain selected clays with sulfuric, hydrochloric or other mineral acid and washing out the reaction products. Both the naturally occurring and the artificially prepared substances in this general class are characterized by a high absorptive capacity which is particularly in evidence in making up the present type of phosphoric acid catalyst, and they may also contain traces of active ingredients which may assist in producing the desired catalytic effects. Each silicate material which is used alternatively exerts its own specific influence upon the net effectiveness of the catalyst composite which is not necessarily identical with that of the other members of the class.

When pyrophosphoric acid is employed in the original mixes the temperatures employed in the mixing step are commonly those comprised within the range of from 248 to 356° F. Within this temperature range the acid is sufficiently fluid to enable rapid mixing by mechanical devices, the time necessary for complete mixing to a substantially homogeneous condition being commonly within the range of from 2–5 minutes. From this point on the operations of grinding the cake, sizing the particles, and calcining at higher temperatures will be the same as when employing the ortho acid.

Owing to the possibility of varying both the active ingredients and the relatively inert absorbent materials which go to form the catalyst masses, a number of alternatives exists each of which will have its own peculiar catalyzing character which will not be exactly equivalent to masses of different composition.

Solid phosphoric acid catalysts are particularly efficient in polymerizing normally gaseous olefins to produce polymers utilizable as good antiknock constituents of motor fuel. In the gases from oil cracking plants there are substantial percentages of 3, 4 and 5 carbon atom hydrocarbons including propylene, butylenes, amylenes and some hexylenes (if the gases are wet) and by the use of solid phosphoric acid catalysts under properly selected conditions of temperature and pressure such olefins are polymerized principally to dimeric forms. The following table shows the approximate boiling points of the dimers of these olefins.

Boiling points of olefin dimers

| | Degrees F. |
|---|---|
| Hexylene | 155 |
| Octylene | 255 |
| Decylene | 323 |
| Dodecylene | 417 |

Of the lower boiling and normally gaseous olefins, ethylene is the most resistant to polymerization by catalysts of the present character, but there are indications that it even polymerizes to some extent and that, in the presence of its higher homologs, it is apparent that a certain amount of mixed polymers are formed.

Polymers of higher molecular weight than di- and trimolecular compounds as shown above are generally of too high boiling point to be used in commercial gasolines and the end products of too extensive polymerization are resinous pitchy solids which are entirely unsuitable.

Solid phosphoric acid catalysts are utilizable in accelerating a relatively large number of different types of organic reactions. Besides acting effectively in polymerizing gaseous olefins they may be employed in a number of condensation reactions such as those between phenols and aldehydes, reactions involving the alkylation of ring hydrocarbons with either olefins, alcohols, aldehydes, ethers, etc., reactions involving the alkylation of ring hydrocarbons containing substituent groups such as phenols and amines, and miscellaneous addition reactions between unsaturated hydrocarbons such as, for example, the addition of halogen acids to olefins. In all these reactions the surfaces of the catalyst particles become gradually contaminated with carbonaceous residues, even though there is only a minimum oxidizing effect evidenced by the phosphoric acid when conditions are properly chosen. The process of the present invention is applicable to deteriorated solid phosphoric acid catalysts from any of these types of reactions, although the conditions of application of the successive steps of treatment may be varied considerably in the case of different spent catalysts.

The polymerizing of gaseous olefins with solid phosphoric catalysts may be brought about under numerous combinations of temperature and pressure, though the best results for any given pure olefin or mixture of olefins such as those encountered in the gases from oil cracking plants, will usually correspond to a particular set of conditions. It is a feature of this type of catalyst that olefin-polymerizing treatments may be conducted at temperatures as high as 482° F. and superatmospheric pressures up to several hundred pounds per square inch without danger of over-polymerization resulting in the formation of excessive quantities of heavy tar-like polymers instead of liquids of gasoline boiling range.

In using these catalysts to polymerize gaseous olefins only simple equipment is necessary such as a tube or tower in which the catalyst is placed as a filling material. The gases may be pumped up to some given pressure and preheated to a suitable temperature prior to passage through the catalyst mass or the catalyst chamber may be heated externally if desired. A few test runs will usually determine the best conditions of operation. For example, if the temperatures and pressures employed are such that the products exist entirely in vapor phase, the flow of the gases through the catalyst may be upward through filled towers while if liquids are condensed, the best results may be obtained when down flows are used so that liquid does not accumulate on the surface of the catalyst.

In regenerating spent granular phosphoric acid catalysts by the present process, the following steps are preferably used in sequence:

1. Treatment with superheated steam at temperatures in the neighhorhood of 600–700° F. to remove distillable substances.

2. Heating in air at temperatures within the range of 850–950° F.

3. Rehydrating with steam at temperatures of from approximately 400–550° F.

It has been found that the conditions indicated are particularly well adapted to the regeneration of phosphoric acid catalysts which have been employed for considerable periods of time in the polymerization of the olefins contained in cracking plant gases. Such gases are shown by analysis to contain small quantities of diolefins such as butadiene and similar compounds, and these apparently are responsible for the gradual deposition of the contaminating substances which lower the efficiency of the catalyst mass.

The first step involving the steaming of the mass is normally conducted until substantially no further condensible oils are produced. The second step involving the use of air (which must be applied with considerable care in the case of catalyst masses contained in commercial sized towers to avoid overheating) is conducted until there is a minimum production of carbon dioxide, which indicates that the carbon is completely burned from the catalyst particles. The time during which steam is applied after the air burning will depend to some extent both upon the temperature of the burning and the time, since the benefits derived from this step are due to the rehydration of the phosphoric acid present in the burned material, to bring the composition back to a point approximating that of pyrophosphoric acid, or at least a mixture of the meta and pyro acid. No entirely general rules can be laid down for the conditions used in any one of the three steps on account of the considerable variations possible in the original composition of the catalyst, the nature and extent of the organic reactions which it has been used to accelerate and a number of more or less indeterminable factors such as the porosity of the catalyst particles, etc.

The final step of steaming to rehydrate the phosphoric acid after the oxidation or burning step requires a definite temperature since it is found by tests that the activity of the spent catalyst is not always restored to the same point when the same amount of weight increase is noted. In other words, if too low a temperature has been used in the final steaming, a certain amount of the added water may be merely absorbed whereas it must be chemically combined in the phosphoric acid to insure the proper acid composition and characteristics. The necessary period of final steaming can be reduced by using steam under pressure, the time reduction being approximately inversely proportional to the pressure employed.

In the following paragraphs some numerical data are given to show the normal results obtainable in the regeneration of solid phosphoric acid catalysts by the process of the present invention, although it is not intended to limit the scope of the invention in accordance with the precise data given. In the tabulated data the "performance factor" is based upon a specially developed method of testing the efficiency of the solid catalysts. This method depends in principle upon noting the rate of liquid polymer formation when passing pure propylene over a definite weight of the catalyst under standardized conditions in respect to rate of gas flow, temperature, pressure, etc.

The following table shows a series of runs made to regenerate a catalyst which had become exhausted after a long period of service in polymerizing a gas mixture from the stabilizer of a cracking plant containing from 20 to 30% of propylene and butylenes. Various conditions of temperature and quantities of air and steam were employed, with or without a preliminary steaming period to remove distillable and carbonizable materials prior to oxidation.

| Run No. | Preliminary steaming | | | Air oxidation | | | | Rehydration steam | | | | Performance factor |
|---|---|---|---|---|---|---|---|---|---|---|---|---|
| | Hrs. | T. °F. | Lb. $H_2O$/lb. cat. | Hrs. | T. °F. | Cu. ft./lb. cat. | % wt. loss | Hrs. | T. °F. | Lb. $H_2O$/lb. cat. | % wt. increase | |
| Fresh catalyst | | | | | | | | | | | | 100 |
| Exhausted catalyst | | | | | | | | | | | | 2 |
| 1 | 4 | 754 | 4 | 20 | 862 | 170 | −28 | 8 | 440 | 5 | +12 | 220 |
| 2 | | | | 19 | 905 | 179 | −27 | 8 | 476 | 13 | +12 | 143 |
| 3 | 4 | 723 | 4 | 20 | 936 | 156 | −29 | 8 | 435 | 3 | +10 | 172 |
| 4 | | | | 9 | 1144 | 59 | −29 | 8 | 460 | 10 | +5 | 125 |
| 5 | | | | 35 | 1250 | 216 | −27 | 8 | 446 | 17 | +4 | 164 |

From the above data it will be seen that the exhausted catalyst had practically no activity. It may also be seen that, for this particular spent catalyst, the conditions of run #1 were the best for its regeneration, since the performance factor of 220 shows that the regenerated material was over twice as active as the originally prepared fresh catalyst which was made by incorporating pyrophosphoric acid with kieselguhr and treating as previously described. Run #3 is comparable with run #1, but shows that there was apparently a disadvantage in employing a temperature above 900° F. in the oxidizing step. In runs 2, 4, and 5 wherein no preliminary steaming was used, inferior results were obtained in the restoration of activity. It may be inferred from the data of runs 4 and 5 that the high temperatures of oxidation form some meta phosphoric acid which was not sufficiently rehydrated, as evidenced by the lower weight increase during the final steaming period.

The fact that the regenerated catalyst showed uniformly a higher activity than the freshly prepared material is of considerable interest. This is probably due to increased porosity produced by the burning out of carbonaceous material from the structure of the particles and also to the accurate control of the acid composition made possible by the final steaming period.

The objects and the practical value of the present invention may be readily seen from the foregoing specification and illustrative data, although neither section is to be considered as imposing undue limitations upon its generally broad scope.

We claim as our invention:

1. A process for the regeneration of polymerization catalysts comprising a phosphoric acid and an adsorbent material which has been contaminated with carbonaceous deposits during the use thereof which comprises, subjecting said catalyst to the action of air to burn off the combustible residues from said catalyst and thereafter to the action of steam at a temperature of from 400° F. to 550° F. to rehydrate the phosphoric acid.

2. A process for the regeneration of polymerization catalysts comprising a phosphoric acid and an adsorbent material which has been contaminated with carbonaceous deposits during the use thereof which comprises, subjecting said catalyst to the action of air at a temperature of from 850° F. to 950° F., to burn off the combustible residues from said catalyst and thereafter to the action of steam at a temperature of from 400° F. to 550° F. to rehydrate the phosphoric acid.

3. A process for regenerating solid phosphoric acid catalysts contaminated with carbonaceous deposits, which comprises burning the carbonaceous deposit from the catalyst and steam-treating the burned catalyst at a temperature between 400° and 550° F. sufficiently to rehydrate the acid contained therein or a substantial portion thereof to a point approximating pyrophosphoric acid.

4. A process for regenerating solid phosphoric acid catalysts contaminated with carbonaceous deposits, which comprises burning the carbonaceous deposit from the catalyst and treating the burned catalyst with steam at a temperature in excess of 400° F to rehydrate the phosphoric acid.

5. A process for regenerating solid phosphoric acid catalysts contaminated with carbonaceaus deposits, which comprises burning the carbonaceous deposit from the catalyst and treating the burned catalyst with steam at a temperature between 400° F. and 550° F. to rehydrate the phosphoric acid.

6. A process for regenerating solid phosphoric acid catalysts contaminated with carbonaceous deposits, which comprises burning the carbonaceous deposit from the catalyst and treating the burned catalyst with steam at a temperature in excess of 400° F., the steam treatment being sufficient to rehydrate a substantial portion of the acid content of the catalyst to a point approximating pyrophosphoric acid.

VLADIMIR IPATIEFF.
BEN B. CORSON.